United States Patent [19]
Goupy et al.

[11] 3,883,168
[45] May 13, 1975

[54] COMPOSITE VEHICLE BUMPER

[75] Inventors: Marcel Goupy; Pierre Roubinet, both of Billancourt (Hauts de Seine), France

[73] Assignees: Regie Nationale des Usines Renault, Billancourt (Hauts de Seine); Automobiles Peugeot, Paris, both of France

[22] Filed: Mar. 7, 1974

[21] Appl. No.: 449,103

[30] Foreign Application Priority Data
Mar. 13, 1973 France .............................. 73.08881

[52] U.S. Cl................................ 293/98; 161/DIG. 4
[51] Int. Cl.............................................. B60r 19/04
[58] Field of Search ........... 293/1, 60, 62, 70, 71 R, 293/71 P, 98; 114/219; 161/DIG. 4

[56] References Cited
UNITED STATES PATENTS

| | | | |
|---|---|---|---|
| 1,966,453 | 7/1934 | Lyon...................................... | 293/98 |
| 3,734,557 | 5/1973 | McKenzie.......................... | 293/71 R |
| 3,744,835 | 7/1973 | Carbone et al....................... | 293/60 |

Primary Examiner—Richard A. Schacher
Assistant Examiner—Robert Saifer
Attorney, Agent, or Firm—Fleit & Jacobson

[57] ABSTRACT

This composite bumper for motor vehicle comprises apertures, such as necessary for fitting side and tail lamps, flashing direction indicators, of constituting ventilation inlets, comprises a shaped element formed with said apertures which consists of a multidirectional stratified fibers-and-resin structure, and at least one reinforcing element consisting of a unidirectional stratified structure of resin-impregnated yarns or fibers extending outside said apertures. Simplified manufacturing methods are proposed to this end.

5 Claims, 7 Drawing Figures

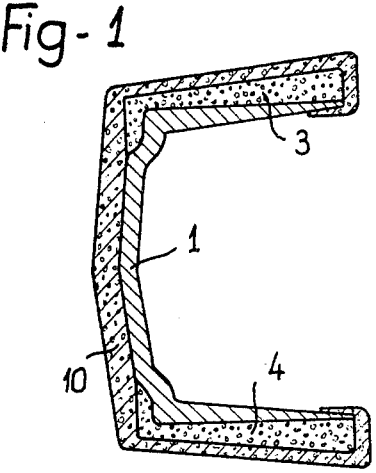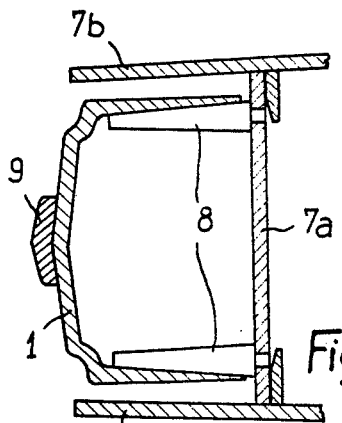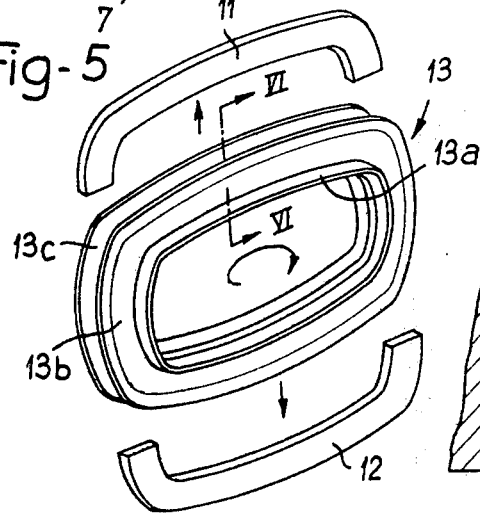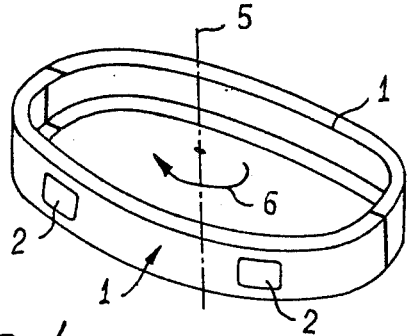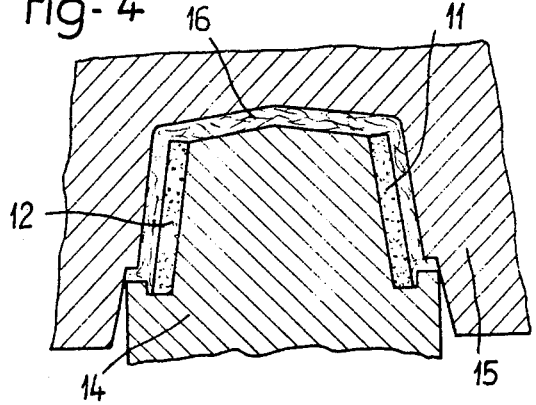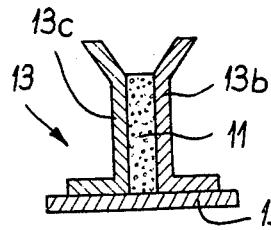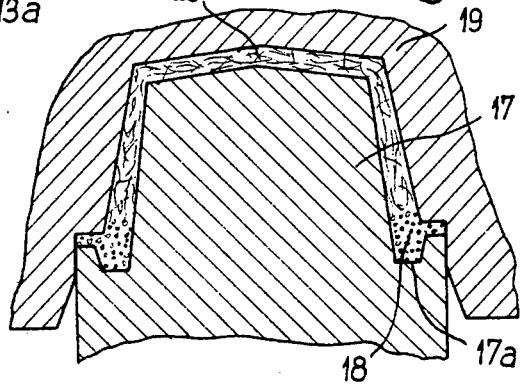

COMPOSITE VEHICLE BUMPER

The present invention relates in general to bumpers for automobile vehicles and has specific reference to composite bumpers for motor vehicles and also to the methods of manufacturing same.

Improved composite bumpers incorporating elements to which elastic or shock-absorbing functions are devolved are already known. Thus, in a known construction hydraulic rams, gas- or liquid-filled inflatable elements, spring means, breakable sections, and the like, have been associated with conventional bumpers with a view to absorb a certain amount of kinetic energy durng a shock, crash or collision between the vehicle and an obstacle.

Thus, in most instances complicated, heavy, cumbersome and expensive devices are obtained, with a disputable or at least unequal coefficient of energy absorption.

Very satisfactory results have been obtained however by applying the method disclosed in the Applicants' U.S. Pat. application Ser. No. 314,982, filed Dec. 14, 1972.

The above identified application for a bumper manufactured according to the so-called "filament-winding" technique, wherein glass fibers embedded in, or coated with thermosetting synthetic resin are wound under a certain degree of prestress around a detachable core, whereby the parallel-wound turns disposed in horizontal planes determine the height of the finished bumper. Thus, a loop structure may be obtained which is cut into two halves along its major axis to provide a pair of bumpers.

However, this manufacturing procedure is attended by several inconveniences, notably in the case of bumpers comprising openings for receiving, for example, side and tail lights, or flashing direction indicators, ventilation inlets, etc., which preclude the simple filamentary winding operation mentioned hereinabove.

It is the chief object of the present invention to solve these problems while preserving the possibility of applying an easy and economical bumper manufacturing process, without impairing the considerable energy absorption capacity of the bumpers, based on the delamination of glass fibers coated with polymerisable synthetic resin.

Basically, the composite apertured bumper according to this invention is characterised in that it comprises a shaped element formed with the necessary apertures, which consists of a multidirectional fibers-and-resin stratified structure, and of at least one reinforcing element consisting of a unidirectional stratified structure of resin impregnated yarns extending outside said apertures.

This invention affords various forms of embodiment of such bumpers and also of the methods of manufacturing same, as will be disclosed presently, some of said method forms relying on the filament-winding technique for fabricating the unidirectional stratified structure.

Various forms of embodiment of the bumper according to this invention will now be described by way of example with reference to the accompanying drawing, in which:

FIG. 1 is a cross-sectional view of the composite bumper according to a first form of embodiment;

FIG. 2 is a perspective view showing diagrammatically a typical method of manufacturing a bumper of the type illustrated in FIG. 1;

FIG. 3 is a part-sectional view showing means suitable for use when applying the method of FIG. 2;

FIG. 4 is a cross-sectional view of a bumper element illustrated during the moulding step;

FIG. 5 is a perspective view illustrating the manufacturing of the various sections of the bumper element of FIG. 4;

FIG. 6 is a cross-section taken along the line VI—VI of FIG. 5, and

FIG. 7 is a cross-section showing a bumper element during a molding step.

The composite bumper shown in cross-section in FIG. 1 comprises an inner element 1 having a substantially U-shaped cross-sectional contour, shaped by conventional molding technique to the desired general bumper configuration, by using suitable fibers (such as glass or carbon fibers) impregnated with or embedded in organic resins, such as polyesters or epoxy resins, either before or after the molding operation proper. This element may be referred to as a crossed-fibre multidirectional element.

The shaping mould (not shown) is simply adapted in any conventional manner to provide in said element 1 apertures such as the ones visible at 2 in FIG. 2, for receiving the side or tail light, or the flashing direction indicators, or ventilation inlets, as mentioned hereinabove.

The bumper of FIG. 1 further comprises two reinforcing elements 3 and 4 covering the upper wing and the lower wing, respectively, of the aforesaid element 1, as viewed in FIG. 1, and also the marginal portions of its front face; however, the inner registering edges of these elements 3, 4 are spaced from each other by a distance corresponding substantially at least to the height contemplated for the aforesaid apertures 2. These reinforcing elements 3 and 4 consist of unidirectional stratified structures made of glass fibers coated with thermosetting synthetic resin, and can be fabricated by applying the aforesaid filament-winding method. To this end, a pair of molded bumper elements 1 are disposed end to end as shown in FIG. 2 to constitute a closed loop around which the filament-winding is formed about an axis perpendicular to the loop plane, which is shown diagrammatically at 5, the arrow 6 designating the winding direction taken by way of example.

FIG. 3 is a typical example of means for simultaneously obtaining under a certain tension the windings corresponding to the two reinforcing elements 3 and 4. In this case, the pair of elements 1 are disposed as a closed loop on a spool-forming support 7 comprising a hub 7a provided with centering studs 8 for each element 1, and detachable side plates 7b, 7c bounding in relation to the wings of each element 1 the space corresponding to that necessary for receiving said reinforcing element 3 or 4. These elements may likewise be obtained according to the filament-winding technique as set forth hereinabove with reference to FIG. 2, and during this operation the elements 1 may be clamped against the spool hub by means of a detachable strap or bond 9.

Then, by performing a second molding step, a layer 10 of elastomer, such as semi-rigid polyurethane, or a rigid plastic material, is added to the outer surfaces of said elements 1 and 3, 4 of the bumper, as illustrated in FIG. 1, while keeping the apertures 2 unobstructed.

Another form of embodiment of this composite bumper is illustrated in FIGS. 4, 5 and 6 of the drawings. FIGS. 5 and 6 depict a first manufacturing step during which the reinforcing elements 11 and 12 are obtained by applying the filament-winding technique and using fibers coated with thermosetting synthetic resin and wound on a spool 13 of which the hub 13a and flanges 13b, 13c bound a space corresponding to the shape of the two elements 11 and 12 contemplated. The winding may conveniently be formed under a certain tension, for example by rotatably driving the spool to this end. Thereafter, the elements 11 and 12 are obtained by dividing the filament winding formed by means of this spool into two halves or equal portions, by cutting, as illustrated in FIG. 5.

Then, during a molding step illustrated in FIG. 4, the reinforcing elements 11 and 12 constituting an unidirectional stratified structure are disposed as shown on a mold element 14 having a contour suitable for receiving these reinforcing elements, and covered with fibers impregnated with organic resin and adapted to be shaped by a second mold element 15 acting in conjunction with said first element, to form a bumper element 16 having a general configuration similar to that of said element 1 of the preceding example and formed like this element 1 with apertures disposed at the desired locations and obtained by means of the mold 14, 15. As in element 1, this element 16 comprises a multidirectional stratified structure.

Subsequently, during a second molding operation, the mold element 15 is removed and another mould element (not shown) is substituted therefor for depositing by molding on said element 16 a layer of semi-rigid or rigid material corresponding to the layer 10 of the preceding example.

FIG. 7 illustrates another form of embodiment of a composite bumper according to this invention. In this example, a stratified sheet 20 of multidirectional material 20 and two unidirectional reinforcing elements 18 are built up simultaneously by molding between the two mold elements 17 and 19. The unidirectional reinforcing elements consist of continuous parallel fibres, for example glass or carbon fibers, pre-impregnated or not. If desired, these unidirectional reinforcing elements 17 and 19 may be prepared beforehand by winding, or by assembling parallel fibers. A pair of grooves 17a surrounding the base of the male mold section are provided in this example for receiving the unidirectional reinforcing elements 18. Finally, a layer of semi-rigid or rigid material is molded over the assembly, as in the preceding examples.

In a typical example, filaments having a diameter of the order of 8 to 14$\mu$ and comprising from about 50 to about 80 percent of fibers (preferably E-glass) and about 20 to about 50 percent of resin (polyester or epoxy resin) are used for constituting the unidirectional stratified structure or the filament winding.

As far as the multidirectional layer is concerned (which is preferably pre-impregnated), it comprises about 25 to 35% of glass fibers and about 65 to 75% of resin, with or without filler.

On a bumper having a developed lengh of 1,850 mm (73 feet), with a 4-mm (5/32 inch) thick front face and 6-mm (0.5 inch) thick marginal portions, it was found during shock tests that an energy corresponding to 1,000 Joules could be absorbed reversibly by the bumper, this value being doubled under nonreversible conditions.

As a rule, complementary energy-absorbing means connecting its rear face to the vehicle frame structure may be associated with the bumper of this invention.

Of course, various modifications and variations may be brought to the specific forms of embodiment shown and described herein without departing from the basic principles of the invention, as will readily occur to those conversant with the art.

What is claimed as new is:

1. Composite bumper for motor vehicles, which comprises a shaped element having a plurality of apertures formed therein, this element consisting of a multidirectional stratified structure of fibers and resin, and at least one reinforcing element consisting of a unidirectional stratified structure of resin-impregnated fibers extending outside said apertures.

2. Bumper according to claim 1, characterised in that it further comprises a layer of material lining the outer face of the bumper, which is the face most liable to receive shocks in service.

3. Bumper according to claim 2, characterised in that said lining material consists of a suitable elastomer.

4. Bumper according to claim 1, characterised in that said shaped element has a substantially U-shaped cross-sectional contour and including two reinforcing elements positioned on the U-shaped element.

5. Bumper according to claim 1, characterised in that said shaped element is hollow and the reinforcing element comprises a belt surrounding said shaped element.

* * * * *